July 4, 1967 G. C. MAYER 3,329,313
CONSTANT WEIGHT FEEDING APPARATUS
Filed Sept. 29, 1965 3 Sheets-Sheet 3

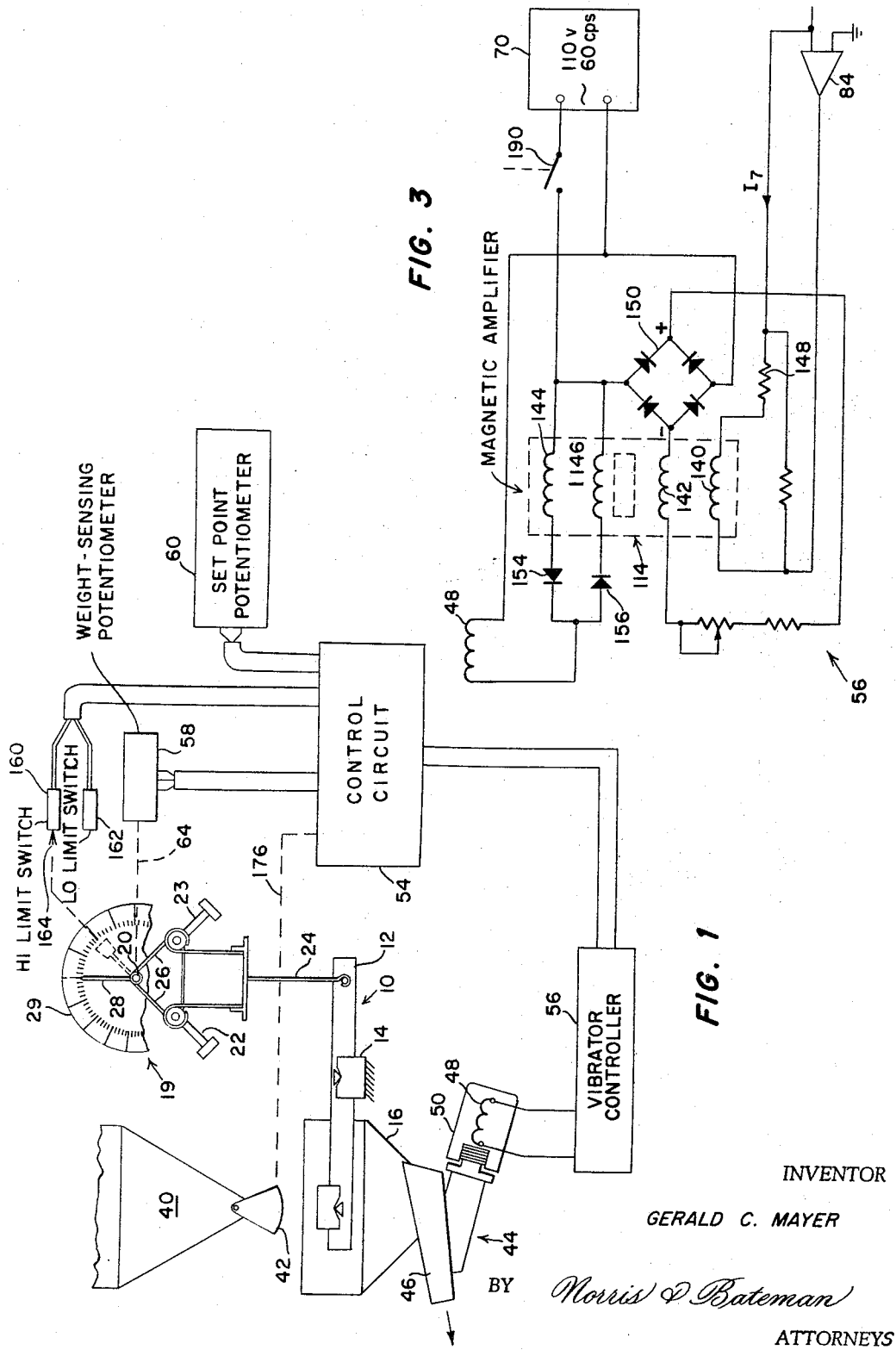

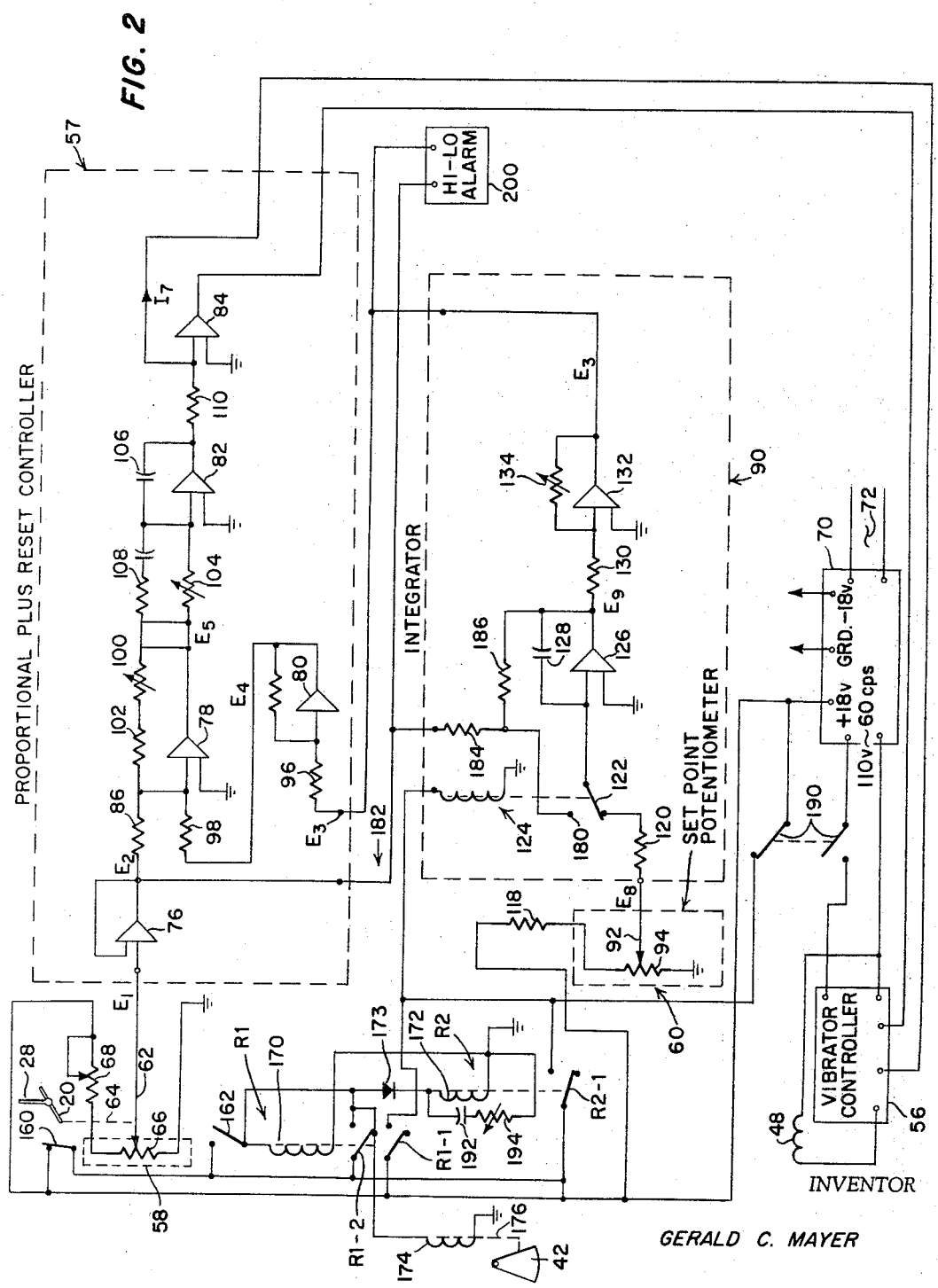

INVENTOR.
GERALD C. MAYER
BY
Norris & Bateman
ATTORNEYS

United States Patent Office 3,329,313
Patented July 4, 1967

3,329,313
CONSTANT WEIGHT FEEDING APPARATUS
Gerald C. Mayer, Wayne, N.J., assignor to Howe Richardson Scale Company, Clifton, N.J., a corporation of Delaware
Filed Sept. 29, 1965, Ser. No. 491,318
17 Claims. (Cl. 222—58)

The present invention relates to feeding apparatus of the type which feed bulk material or other fluids from a source of supply at a continuous, controlled, pre-selected rate. More particularly, this invention is concerned with a novel constant weight feeder which operates on a loss-in-weight principle to obtain a pre-selected, constant rate of material flow from a receptacle to a point of use.

Normally, the rate at which material discharges from a vessel under the influence of gravity varies in accordance with the head of material in the vessel. To obtain a controlled rate of material discharge for certain applications various feeding devices commonly known as constant weight feeders have been proposed prior to this invention. Some of these prior feeding devices are responsive to the weight of undischarged material in the discharging receptacle to control the material discharge rate; others are responsive to weight of material discharged onto a conveyor or the like for maintaining a control of the discharge rate. Conventional feeders of both types are usually complicated and do not control the discharge rate accurately. In constant weight feeders which respond to the weight of material in the discharging vessel, no simplified provision is made for re-filling the receptacle while material is being discharged without objectionably interfering with the rate-setting control action.

The present invention has for its major object the provision of a novel apparatus for accurately controlling the discharge rate of material from a receptacle.

A more specific object of this invention is to provide a novel feeding apparatus which provides for the continuous removal of material from a receptacle and which is responsive to the loss in weight of material in the receptacle to control the material discharge rate.

In conjunction with the last-mentioned object, it is a further object of this invention to provide a novel, simplified control arrangement whereby the receptacle is intermittently re-filled during the continuous discharge of material therefrom without objectionably departing from the desired, material discharge rate.

A more specific object of this invention is to provide an electrical control circuit for maintaining the rate at which material discharges from a receptacle constant, said control circuit having (a) an integrating network responsive to a selectively fixed, set point voltage for producing a reference ramp voltage, (b) a proportional-reset controller for producing an error voltage by comparing the ramp voltage with an input voltage that varies in accordance with the weight of material in the receptacle, and (c) a material flow adjusting device that responds to the error voltage of the controller to control the discharge rate of material from the receptacle.

In conjunction with the last-mentioned object, another more specific object of this invention is to provide a switching circuit responding to a predetermined depletion of materal in the receptacle for re-filling the receptacle and for replacing said set point voltgae with said input voltage during the re-filling cycle to cause the measured difference between the voltages fed into said controller to go to zero, the reset action of the controller being effective when the measured difference goes to zero to maintain a fixed output signal to said flow adjusting device.

Further objects of this invention will appear as the description proceeds in connection with the appended claims and the annexed drawings wherein:

FIGURE 1 is a diagrammatic view of a feeding apparatus incorporating the principles of this invention;

FIGURE 2 is a schematic diagram of the control circuit shown in block form in FIGURE 1;

FIGURE 3 is a schematic diagram of the vibrator controller shown in FIGURE 1 for controlling the operation of a vibrating feeder.

Figure 4:
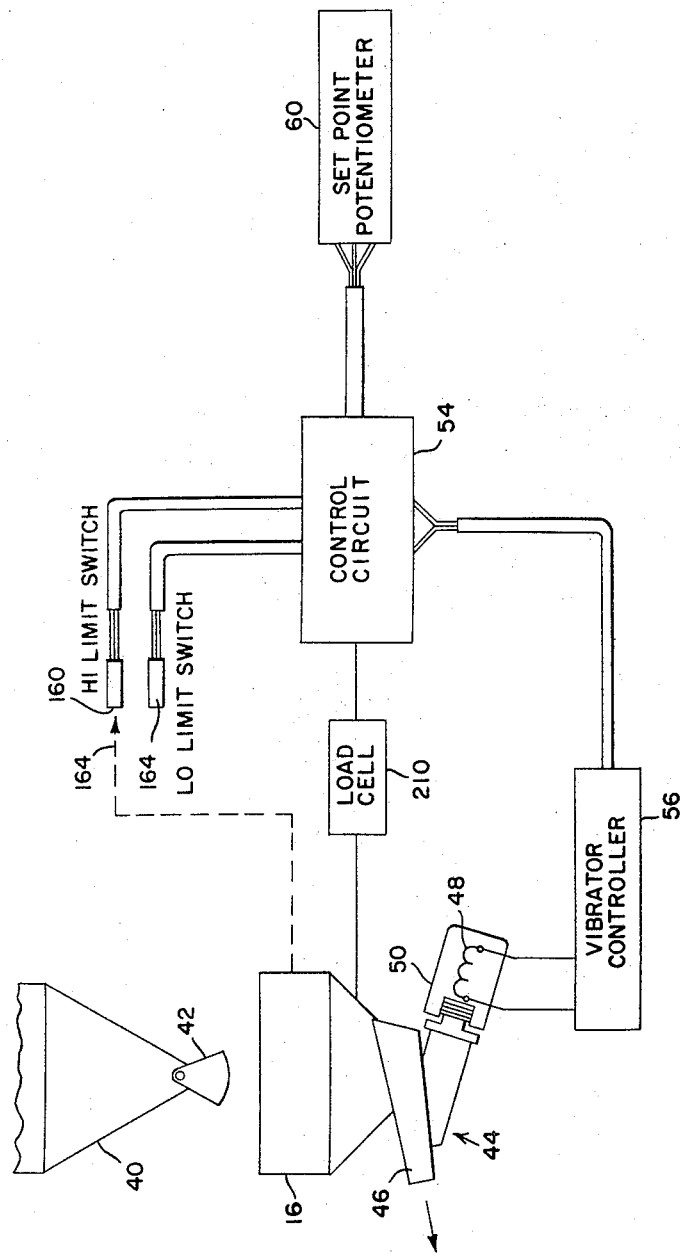
FIGURE 4 is a schematic view of a modified embodiment of this invention.

Referring now to the drawings and more particularly to FIGURE 1, the reference numeral 10 generally designates a scale which may be of any suitable, conventional form and which is shown to comprise a lever 12 fulcrumed about a horizontal axis by a knife edge and bearing block assembly 14. A weight hopper 16 is pivotally suspended from one end of lever 12. Hopper 16 advantageously is stabilized by a conventional, unshown drag link and is preferably sized to hold about three times the nominal scale capacity. This provides for a large "heel" point and considerable overflow capacity. The relatively large "heel" is desired to afford the feeder of this invention with a minimum head of material so that fluctuations of the material discharge rate due to variations of the head are minimized.

The end of lever 12 on the side of the fulcrum axis opposite from hopper 16 is operably connected to a weight sensing dial mechanism 19. Dial mechanism 19 may be of any suitable, conventional form such as that described in United States Letters Patent No. 2,793,000 issued on May 21, 1957, to E. Klien et al. for "Weight Controlled Apparatus," and is shown to essentially comprise a pair of pendulums 22 and 23 connected to lever 12 by a motion transmitting linkage 24. Pendulums 22 and 23 are connected by flexible tapes 26 to a dial shaft 20 to rotate shaft 20 when lever 12 is fulcrumed about its axis at 14 by feeding or discharging material with respect to hopper 16. If desired, an indicator 28 may be mounted on shaft 20 to move over a dial face 29 for indicating the weight of material in hopper 16.

As shown in FIGURE 1, a material storage bin 40 has a bottom outlet opening disposed above the upper open end of weigh hopper 16 to deliver material thereto. Discharge of material through the bottom outlet opening of storage bin 40 is controlled by a conventional, solenoid operated gate 42 in a manner to be described in detail later on.

Material in weigh hopper 16 is removed in a continuous stream through a bottom opening in the hopper by a vibrating feeder assembly 44 of suitable, conventional form. Feeder assembly 44 preferably is a model F-T0 feeder manufactured by the Syntron Company and is shown to essentially comprise a feed chute 46 disposed below the bottom opening of hopper 16 and vibrated at high frequency by energizing a field winding 48 of an electro-magnetic motor 50. The rate of discharge of material from hopper 16 is controlled by the amplitude of vibrations applied to feed chute 46 by motor 50, and the amplitude of vibrations applied to chute 46 is controlled by the strength of current supplied to energize winding 48.

In accordance with this invention, a circuit 54 responding to the loss in weight of material in hopper 16 controls the amplitude of vibrations produced by feeder assembly 44 through a controller 56 to maintain the rate at which material discharges from hopper 16 constant. Circuit 54, as shown in FIGURE 2, comprises an electronic controller 57 of suitable, conventional form having proportional plus reset control action. Controller 57 responds to a measured variable input voltage and a reference setting set point voltage for producing an error voltage that is fed to controller 56. The variable input voltage is provided by a weight sensing potentiometer 58 which is operatively connected to dial mechanism 19, and the reference setting voltage is supplied by a rate-setting, set point potentiometer 60.

Referring now in detail to FIGURE 2, potentiometer 58 is shown to comprise a slider or wiper contact 62 operatively connected by a suitable motion transmitting linkage 64 to shaft 20 for movement along a resistor 66. One terminal of resistor 66 is connected to ground. The other terminal of resistor 66 is connected through a variable resistor 68 to a D-C positive bias voltage furnished by a suitable D-C supply source such as a filtered and regulated full wave rectifier module 70 which converts A-C line power at 72 into D-C energizing power of relatively low voltage.

With continuing reference to FIGURE 2, controller 57 is shown to comprise a voltage follower amplifier 76, a pair of adder-subtractor amplifiers 78 and 80, a reset amplifier 82 and a voltage-to-current amplifier 84. The voltage $E_1$ on slider 62 is proportional to the weight of material in hopper 16 and is fed to the input circuit of voltage follower amplifier 76. Voltage $E_1$ in this embodiment varies in a range between zero and plus 10 volts. Amplifier 76 forms a buffered input to controller 57, reflecting a very high impedance to the slide of potentiometer 58 to avoid any loading errors. The output voltage $E_2$ of amplifier 76 thus is equal to $+E_1$ and is fed through a dropping resistor 86 to the input circuit of adder-subtractor amplifier 78.

Still referring to FIGURE 2, the input circuit of adder-subtractor amplifier 80 is connected to the output of an analogue integrator circuit 90. During the weighing cycle when no material is being fed to hopper 16, the input of integrator circuit 90 is connected to the slider 92 of potentiometer 60. Slider 92 is set to a selected position on a resistor 94 to impress a fixed set point voltage signal on integrator circuit 90. Integrator circuit 90, to be described in detail later on, may be of any suitable form for generating a linear ramp voltage $E_3$ as is well understood in the art. The slope of ramp voltage $E_3$ is determined by and is directly proportional to the input voltage furnished by potentiometer 60. The output of integrator circuit 90 is connected through a resistor 96 to impress voltage $E_3$ on the input circuit of amplifier 80. Ramp voltage $E_3$ thus constitutes the set point for controller 57 and is a linear function of the setting of potentiometer 60. In this embodiment, a rate setting, set point range of from 1 to 10 lbs. is provided for. Integrator circuit 90 thus functions to convert the fixed voltage signal furnished by potentiometer 60 into a rate setting ramp signal that can be compared in controller 57 with the weight-sensing ramp signal obtained from potentiometer 58 during discharge of material from hopper 16.

With continuing reference to FIGURE 2, amplifier 80 inverts the input voltage $E_3$ so that the result can be a subtraction of voltages $E_2$ and $E_3$ at amplifier 78. The output voltage $E_4$ of amplifier 80 thus is equal to $-E_3$. The output circuit of amplifier 80 is connected through a resistor 98 to the input circuit of amplifier 78. The output voltage $E_4$ of amplifier 80 is thus fed to amplifier 78 and is added to voltage $E_2$. Amplifier 78 has a feedback network comprising series connected resistors 100 and 102. The sum of voltages $E_2$ and $E_4$ at amplifier 78 is amplified to an amount as determined by the ratio of feedback resistance to the input resistors.

The output voltage $E_5$ of amplifier 78 is thus equal to $-K(E_2+E_4)$ where K equals the ratio of resistors 100 and 102 to resistors 84 and 98. Since voltage $E_2$ equals voltage $E_1$ and since voltage $E_3$ equals $-E_4$, then voltage $E_5$ is equal to $K(E_3-E_1)$ wherein the difference of $E_3-E_1$ is the error. Voltage $E_5$ thus represents the measured difference between the fixed rate reference and the decreasing weight of material in hopper 16 during discharge.

With continued reference to FIGURE 2, the output circuit of amplifier 78 is connected through a variable resistor 104 to the input circuit of reset amplifier 82 to impress the error voltage $E_5$ on amplifier 82. Amplifier 82 is connected in a conventional reset network which is well understood in the art and which is shown to comprise a capacitance feedback 106 and an RC coupling branch 108 connected in parallel circuit relation with resistor 104. The transfer function of reset amplifier 82 is well understood in the art and produces an output voltage $E_6$ in response to the impression of voltage $E_5$ on its input circuit. Accordingly, the voltage $E_6$ represents the deviation signal resulting from combining the cascaded proportional and reset modes of controller 57.

As shown in FIGURES 2 and 3, the output circuit of amplifier 82 is connected through a dropping resistor 110 to the input circuit of current amplifier 84 which generates a corrective current $I_7$ to power a magnetic amplifier 114 forming a part of the vibrator controller 56. The proportional plus reset control action of controller 57 thus produces a corrective output signal that depends not only on the size of the error signal (the measured difference between voltages $E_1$ and $E_3$), but also on its duration as is well known in the art. As a result, the corrective output signal of controller 57 is a function of time and magnitude of the deviation from the rate setting, reference ramp signal generated by integrator circuit 90.

As shown in FIGURE 2, one terminal of resistor 94 of potentiometer 60 is connected to ground, and the other terminal is connected through a variable, range adjustment resistor 118 to the positive D-C voltage side of module 70. Slider 92 is serially connected through a dropping resistor 120 and a contact arm 122 of a relay 124 to the input circuit of an amplifier 126 forming a part of integrator circuit 90. The selectively fixed reference voltage $E_8$ on slider 92 is thus fed to amplifier 126. Amplifier 126 coacts with a feedback capacitor 128 in a manner well understood in the art to perform an integrating transfer function for converting the fixed reference voltage into a rate setting ramp voltage $E_9$ having a slope which is proportional to the input voltage furnished by potentiometer 60. Voltage $E_8$ thus is equal to $-E_7t/R_1C_1$ where $R_1$ and $C_1$ respectively represent the values of input resistor 120 and capacitor 128.

The output ramp voltage of amplifier 126 is fed through a dropping resistor 130 and is impressed on the input circuit of an amplifier 132. Amplifier 132 inverts voltage $E_9$ to produce the output voltage $E_3$ which is fed to controller 57. A variable resistance feedback 134 is connected to amplifier 132 to provide a unity gain.

Magnetic amplifier 114 may be of any suitable conventional form and is shown in FIGURE 3 to compromise a pair of biasing coils 140 and 142 and a pair of operating coils 144 and 146. One terminal of coil 140 is connected to the output circuit of amplifier 84. The other terminal of coil 140 is connected through a resistor 148 to the input side of amplifier 84 to complete a circuit for energizing coil 140 with the output current $I_7$ of controller 57. Coil 142 is connected across the output terminals of a full wave rectifier 150. The input terminals of rectifier 150 are connected across the A-C source provided through module 70 to energize coil 142 with a direct current.

With continued reference to FIGURE 3, coil 144 is energized by a circuit which may be traced from one side of the A-C source at module 70 through winding 48, through a diode 154 and through coil 144 to the other side of the A-C source at module 70. Coil 146 is connected in series with a diode 156 in a branch circuit that is in parallel circuit relationship with the branch circuit containing coil 144 and diode 154. Diodes 154 and 156 are so arranged as to allow current of only one polarity to flow through coil 144 and current of only the opposite polarity to flow through coil 146. Winding 48 is continuously energized alternately through coil 144 and coil 146.

As is well understood in the art, coils 140 and 142 apply a D-C bias to coils 144 and 146 to cause amplifier 114 to operate in the flat range of the hysteresis loop. The output current $I_7$ of controller 57 in applying a corrective action varies the impedance in coils 144 and 146 to thereby vary the strength of the energizing current flowing through winding 48. By increasing or decreasing the strength of the energizing current for winding 48, the amplitude of vibrations produced by feeder assembly 44 is proportionately increased and decreased to thereby correspondingly increase and decrease the rate at which material is discharged from hopper 16.

As shown in FIGURES 1 and 2, circuit 54 includes a a normally closed, high limit switch 160 and a normally open, low limit switch 162 for controlling operation of gate 42 to intermittently fill hopper 16. Switches 160 and 162 are actuated by a follower 164 which is mounted for rotation with shaft 20 of dial mechanism 19. Low limit switch 162 is positioned to be closed by follower 164 when the weight registered on dial 29 is reduced to some selected amount just above zero. Closing of switch 162 energizes a pair of relays R1 and R2.

The energizing circuit for relay R1 may be traced from the positive D-C bias side at module 70, through normally closed, high limit switch 160, through low limit switch 162, and through winding 170 of relay R1 to ground. The energizing circuit for relay R2 may be traced from the prositive D-C bias side at module 70 through switches 160 and 162, through a diode 173, and through winding 172 of relay R2 to ground. Closing of contacts 162 also completes a circuit for energizing a solenoid 174 having a plunger connected by a suitable motion transmitting linkage 176 to gate 42. Energization of solenoid 174 opens gate 42 to feed material from bin 40 to hopper 16. Relay R1 is provided with a pair of normally open contacts R1–1 and R1–2.

Closing of contacts R1–1 energizes relay 124. Closing of contact R1–2 provides a holding circuit for latching both relays R1 and R2 in their energized positions through high limit switch 160. Relay R2 will energize some short period of time action. Switch 162 closed owing to a capacitor 192 shunted across coil 172. Thus, the opening of low limit switch 162 resulting from the initial amount of material delivered to hopper 16 during a filling cycle does not cause relays R1 and R2 to de-energize. Relays R1 and R2 remain latched in through high limit switch 160 and contacts R1–2 until the weight of material delivered to hopper 16 reaches a pre-selected dial position where follower 164 actuates high limit switch 160 to its opened position.

Opening of high limit switch 160 interrupts the latching circuit through contacts R1–2 to thereby de-energize relays R1 and R2. De-energization of relay R1 opens contacts R1–1 and R1–2. Opening of contacts R1–1 de-energizes solenoid 174 to close gate 42. After hopper 16 is filled and as soon as material begins to discharge from hopper 16 by activating feeder 44, high limit switch 160 closes, but this action does not establish circuit continuity for re-energizing relays R1 and R2 at this stage since low limit switch 162 is open.

As shown in FIGURE 2, relay R2 is provided with a set of normally open contacts R2–1 which close to complete a circuit for holding the energization of relay 124. This energizing circuit for relay 124 may be traced from the positive D-C bias side at module 70 through high limit switch 160, through contacts R2–1, and through the winding of relay 124 to ground.

Relay 124 is energizable to replace the set point potentiometer voltage $E_8$ with the weight sensing potentiometer voltage and to convert amplifier 126 into a unity gain amplifier during the intermittent filling cycles for a purpose to be explained shortly.

As shown in FIGURE 2, energization of relay 124 shifts contact arm 122 to engage a contact 180 with the result that the input circuit of amplifier 126 is disconnected from slider 92 of set point potentiometer 60 and is connected to a tracking circuit 182. Tracking circuit 182 impresses the output voltage $E_2$ of amplifier 76 on the input circuit of amplifier 126 through a dropping resistor 184.

With continuing reference to FIGURE 2, the terminals of a feedback resistor 186 are respectively connected to the output cricuit of amplifier 126 and to contact 180. Thus when relay 124 is energized, resistor 186 is connected through contact arm 122 to the input circuit of amplifier 126 in parallel circuit relation with feedback capacitor 128.

The resistance of resistor 186, in accordance with this invention, is selected to convert amplifier 126 into a unity gain amplifier. Thus when relay 124 is energized to connect tracking circuit 182 and resistor 186 to the input of amplifier 126, the output of amplifier 126 $E_9$ will equal $-E_2$ which, in turn, is equal to the output voltage on slider 62 of potentiometer 58. Amplifier 132 inverts the voltage signal $E_9$ such that the output voltage signal $E_3$ of integrator circuit 90 is equal to voltage signal $E_2$ impressed on adder-subtractor amplifier 78. It therefore will be appreciated that the rate setting output ramp signal of integrator circuit 90 becomes equal to the measured variable scale signal at slider 62 to reduce the deviation therebetween to zero whenever relay 124 is energized. In this manner integrator circuit 90 tracks the output of the scale potentiometer 58 during the filling cycle.

During the filling cycle, therefore, capacitor 128 will be charged by the output voltage signal $E_2$. When high limit switch 160 opens signifying the completion of the filling cycle, relay 124 is de-energized to again connect the set point potentiometer 60 to amplifier 126. The charge on capacitor 128 thus will be equal to the voltage signal produced by the scale potentiometer 58 at the instant of switchover and will be equal to $-E_1$. This voltage is inverted by amplifier 132 to $+E_1$. Accordingly, it will be appreciated that the ramp generated by integrator circuit 90 upon switchover to potentiometer 60 will start at a voltage that is equivalent to the voltage on slider 62 of the scale potentiometer 58. With amplifier 126 again connected to potentiometer 60, the slope of the ramp signal generated by integrator circuit 90 will then be determined by the voltage $E_8$ on slider 92. The integration function of circuit 90 is thereby correlated with the scale output voltage signal from potentiometer 58 to assure an accurate reflection of any deviation from the selected discharge rate.

To assure that the ramp signal generated by integrator circuit 90 starts a voltage which is equivalent to that on slider 62 when feeder 44 is started up to begin discharge of material from hopper 16, a further energizing circuit for relay 124 is provided through one pole of a master switch 190 to the positive D-C bias at module 70. Switch 190 has a further pole in the circuit for winding 48. When switch 190 is thrown to energize winding 48, it disconnects from relay 124. As a result, relay 124 can only be energized through the closing of contacts R2–1 when winding 48 is energized to discharge material from hopper 16. When switch 190 is thrown to its opposite position to interrupt the energizing circuit for winding 48, it completes the circuit for energizing relay 124.

In operation of the continuous feeding apparatus of this invention, assume that some material is in hopper 16 and that feeder assembly 44 is turned off by throwing switch 190 to the position shown in FIGURE 2. Relay 124 thus will be energized to connect tracking circuit 182 to the input of amplifier 126 in place of potentiometer 60. Under these conditions, slider 62 of the scale potentiometer 58 will be at some position intermediate its extremities with the result that the voltage $E_1$ between slider 62 and ground will be some positive value between zero and plus 10 volts. This voltage is fed through amplifier 76 as the input for controller 57 and is also supplied as the tracking input to amplifier 126. With relay 124 energized, resistor 186 is connected in the feedback circuit for amplifier 126 to convert amplifier 126 into a unity gain amplifier as previously explained. With feeder assembly 44 turned off, no material is being discharged from hopper 16 and the output and input of integrator circuit 90 are identical and equal to the output voltage on slider 62 of the scale potentiometer. As a consequence, a balanced control condition exists and no corrective action is taken by controller 57.

After slider 92 is set to a selected position for obtaining a desired discharge rate of material (lbs./min.), switch 190 is thrown to its other position for energizing winding 48 and de-energizing relay 124. Energization of winding 48 starts the discharge of material from hopper 16. De-energization of relay 124 disconnects amplifier 126 from tracking circuit 182 and the unity gain input through resistor 186 and connects amplifier 126 to slider 92 of the set point potentiometer 60. Thus, integrator 90 is returned to its normal integrating function with the voltage on slider 92 acting as the input. Having charged capacitor 128 when relay 124 was energized, the output of integrator circuit 90 thus starts out at a value equivalent to the weight of material in hopper 16 and changes at the rate determined by the setting of slider 92. Controller 57 immediately detects an error between the scale input and the integrator input indicating that there is more weight in hopper 16 than that called for by integrator circuit 90. As a consequence, the output of controller 57 will increase which, in turn, will increase the amplitude of vibrations produced by feeder 44 to discharge material at an increased rate. The rate of discharge from hopper 16 will continue to increase with a decreasing weight of material in hopper 16 until the error $(E_3-E_1)$ reduces to zero.

Feeder 44 will continue to discharge material from hopper 16 at this controlled rate until low limit switch 162 is tripped to its closed position by follower 164. Closing of switch 162 energizes relays R1 and R2 as previously described. Energization of relay R1 closes contacts R1–1 to energize relay 124 to thereby connect amplifier 126 to tracking circuit 182. The error signal in controller 57 therefore goes to zero, and feeder 44 retains the volumetric discharge rate which was in effect at that time. At the same time, amplifier 126 is switched over to track the output of scale potentiometer 58, relay R1 is energized to complete the energizing circuit for solenoid 174 to open gate 44. With gate 44 opened, hopper 16 is rapidly re-filled preferably at a rate that is set to provide a 1½ to 2 second fill cycle.

As is well understood in the art, the reset network comprising amplifier 82 in controller 57 in performing an integrating function retains the output that it had at the time the input voltage $E_5$ went to zero. Thus the output of controller 57 is retained at the value determined by the difference between voltages $E_3$ and $E_1$ at the time the switchover is made to the tracking position for re-filling hopper 16. The present invention therefore provides for continuous delivery of material even during the filling cycles without any significant error.

After the material in hopper 16 reaches the high limit, switch 160 is opened to immediately de-energize relay R1 for closing gate 44. Relay R2 is provided with a time delay circuit connected in parallel with winding 172 and containing capacitor 192 connected in series with a variable resistor 194. Resistor 194 is adjusted for de-energizing relay R2 after a delay of one to two seconds following the opening of switch 160 to allow the scale to stabilize. When relay R2 is de-energized, relay 124 de-energizes to again connect integrator circuit 90 to potentiometer 60 for resuming control of the material discharge rate. Tests of the continuous feeder of this invention showed accuracies of better than ±0.25 percent of set rate over a 5 to 1 range and 0.5 percent over a 10 to 1 range.

Advantageously, an alarm circuit 200 may be employed to indicate an alarm condition if the control circuit 54 malfunctions. Alarm circuit 200 may comprise an adder-subtractor of suitable form for determining and amplifying the difference between the output ramp signal of circuit 90 and the scale output voltage at amplifier 76. The output of the alarm adder-subtractor may be fed into a suitable, unshown comparator for driving a relay to signal improper control action.

In the embodiment illustrated in FIGURE 4, potentiometer 58 of FIGURES 1–3 are replaced with a load cell 210, preferably comprising a strain gauge of any suitable, conventional form. Load cell 210 is operatively connected to hopper 16 to provide an analogue output signal which is proportional to the weight of material in hopper 16. This output of load cell 210 is connected to the input circuit of controller 57 in place of potentiometer 58. The operation of the embodiment of FIGURE 4 thus is the same as that described for the embodiment of FIGURES 1–3.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A rate control, material feeding apparatus comprising a receptacle for receiving material and having an outlet for discharging said material in a continuous stream, weight sensing means for producing a first signal that varies in accordance with the weight of material in said receptacle, means providing a rate setting reference signal, means responsive to the measured difference between said signals for controlling the rate of discharge of material from said receptacle and means responsive to a predetermined depletion of material in said receptacle (a) for filling said receptacle with a predetermined amount of material and (b) for reducing said measured difference to zero while said receptacle is being filled with said predetermined amount of material.

2. The material feeding apparatus defined in claim 1 wherein said means for controlling the discharge rate of material comprises a vibrator whose amplitude of vibration is under the control of said measured difference.

3. A rate control material feeding apparatus comprising a receptacle for receiving material and having an outlet for discharging said material in a continuous stream, weight sensing means for producing a first voltage signal that is proportional to the weight of material in said receptacle, an analogue intergrating circuit responsive to a selectively fixed set point voltage signal for producing a rate setting ramp voltage signal, and means responsive to the measured difference between said first voltage signal and said ramp voltage signal for controlling the rate of discharge of material from said receptacle.

4. The material feeding apparatus defined in claim 3 comprising means responsive to the depletion of material in said receptacle to a predetermined amount for refilling said receptacle while continuing to discharge material therefrom, further means responsive to said depletion to replace said set point signal with said first signal during refilling of said receptacle, and means rendering said integrating circuit operative to track said first signal and reduce said measured difference to zero during refilling of said receptacle.

5. The material feeding apparatus defined in claim 4 wherein said means rendering said integrating circuit operative to track said first signal comprises means for converting said integrating circuit into a unity gain amplifier in response to depletion of material to said predetermined amount.

6. The material feeding apparatus defined in claim 3 wherein said means for controlling the rate of discharge comprises selectively actuatable material flow control means and wherein means under the control of material delivered to said receptacle are provided for initiating said ramp signal with a voltage that is equivalent to said first voltage when said flow control means is actuated to start discharge of material from said receptacle.

7. The material feeding apparatus defined in claim 6 wherein said means for initiating said ramp signal with a voltage equivalent to that of said first voltage comprises (a) switching means operative to feed said first voltage to the input of said integrating circuit in place of said set point signal, and (b) means connected into said integrating circuit by said switching means for rendering the output of said integrating circuit equivalent to the input voltage fed thereto.

8. The material feeding apparatus defined in claim 7 wherein said switch means is operative to de-actuate said flow control means for preventing discharge of material when operated to feed said first voltage to the input of said integrating circuit.

9. The material feeding apparatus defined in claim 5 wherein said means responsive to said measured difference comprises (a) a comparator circuit having proportional plus reset control action and being responsive to said first voltage signal and said ramp signal for producing a control signal that is a function of the magnitude of the deviation of said first signal from said ramp signal and the duration that said deviation exists, and (b) a device responsive to said control signal for controlling the rate of discharge of material in such a direction to reduce said deviation, the reset action of said comparator circuit being operative to maintain a predetermined control signal when said measured difference is reduced to zero to thereby maintain a predetermined rate of material discharge during refilling of said receptacle.

10. The material feeding appaartus defined in claim 4 comprising means responsive to filling said receptacle with a predetermined amount of material for replacing said first signal with said set point signal and for rendering said integrating circuit responsive thereto to generate said ramp signal, the slope of said ramp signal being proportional to the magnitude of said set point signal.

11. A rate control, material feeding apparatus comprising a receptable for receiving material and having an outlet opening for discharging material in a continuous stream, weight sensing means operably connected to said receptacle for producing a first voltage signal that proportionally varies in accordance with the weight of material in said receptacle, an analogue integrator circuit responsive to a selectively fixed reference voltage signal for producing a linear ramp voltage signal having a slope proportional to said fixed reference signal, comparator means for producing an output voltage signal in accordance with the measured difference between said first signal and said ramp signal, means responsive to said output signal for controlling the rate of discharge of material from said receptacle, means for refilling said receptacle with material in response to depletion of the material therein to a predetermined amount, and further means responsive to said depletion for replacing said reference signal with said first signal and for converting said integrator circuit into a unity gain amplifier during the period in which said receptacle is being refilled, whereby said measured difference is reduced to zero, said comparator means comprising a proportional-reset control device for maintaining a predetermined output signal when said measured difference goes to zero.

12. The material feeding apparatus defined in claim 11 wherein said means for refilling said receptacle comprises a storage bin, a catch gate movable between positions for respectively blocking and enabling material flow from said storage bin to said receptacle, and means actuatable upon said predetermined depletion of material in said receptacle for moving said gate to its position for enabling material to flow from said bin to said receptacle.

13. The material feeding apparatus defined in claim 12 wherein said receptacle comprises a hopper and wherein said weight sensing means comprises a scale having a fulcrumed weigh beam assembly operatively connected to said hopper.

14. The material feeding apparatus defined in claim 12 wherein said weight sensing means comprises a load cell operably connected to said receptacle.

15. A rate control, material feeding apparatus comprising a receptacle for receiving material and having an outlet for discharging said material in a continuous stream, weight sensing means for producing a first electrical signal representative of the weight of material in said receptacle, means providing an electrical, rate setting ramp signal, means electrically comparing said first signal and said ramp signal to produce an electrical error signal representative of the measured difference between said first signal and said ramp signal, and means responsive to said error signal for controlling the rate of discharge of material from said receptacle.

16. The rate control, material feeding apparatus defined in claim 15 comprising means for delivering material to said receptacle to replenish the supply of material therein, and means under the control of the material in said receptacle for reducing said measured difference to zero while the supply of material in said receptacle is being replenished.

17. The rate control, material feeding apparatus defined in claim 3 wherein said means responsive to said measured difference comprises means for electrical comparing said first signal and said ramp signal.

References Cited
UNITED STATES PATENTS

| | | | |
|---|---|---|---|
| 2,544,155 | 3/1951 | Harkenrider | 222—58 X |
| 2,609,965 | 9/1952 | Kast | 222—58 |
| 2,718,982 | 9/1955 | Long | 222—58 |

ROBERT B. REEVES, *Primary Examiner.*

HADD S. LANE, *Examiner.*